United States Patent
Gonzaga

(10) Patent No.: US 6,935,397 B2
(45) Date of Patent: Aug. 30, 2005

(54) TIRE ASSEMBLING RELEASE MACHINE FOR INDUSTRIAL VEHICLE WHEELS

(75) Inventor: Tullio Gonzaga, Correggio (IT)

(73) Assignee: Butler Engineering & Marketing SRL, Rio Saliceto (IT)

( * ) Notice: Subject to any disclaimer, the term of this patent is extended or adjusted under 35 U.S.C. 154(b) by 33 days.

(21) Appl. No.: 10/443,077

(22) Filed: May 22, 2003

(65) Prior Publication Data

US 2003/0217816 A1 Nov. 27, 2003

(30) Foreign Application Priority Data

May 23, 2002 (IT) .................................. VR2002A0058

(51) Int. Cl.$^7$ ........................................... B60C 25/128
(52) U.S. Cl. .................... 157/1.28; 157/1.24; 157/1.17
(58) Field of Search ............................. 157/1.28, 1.24, 157/1.17, 1.26

(56) References Cited

U.S. PATENT DOCUMENTS

| | | | | |
|---|---|---|---|---|
| 3,545,463 A | * | 12/1970 | Mueller ...................... | 157/1.24 |
| 3,958,618 A | * | 5/1976 | Reuther ...................... | 157/1.2 |
| 5,060,708 A | | 10/1991 | Hansen | |
| 5,649,582 A | | 7/1997 | Hjorth-Hansen | |
| 5,758,703 A | * | 6/1998 | Mimura ...................... | 157/1.28 |
| 6,443,206 B1 | * | 9/2002 | Bonacini ................... | 157/1.24 |

FOREIGN PATENT DOCUMENTS

EP  1 040 941 A2  10/2000

* cited by examiner

Primary Examiner—Joseph J. Hail, III
Assistant Examiner—Alvin J Grant
(74) Attorney, Agent, or Firm—Nixon & Vanderhye P.C.

(57) ABSTRACT

The present invention provides a tire assembling/disassembling machine, particularly for industrial vehicle wheels, having a support frame (2) delimiting a foreheadt, a back and two sides, a rigid support framework (13) articulated at the back of the support frame (2) according to an articulation axis (12), driving means (15) for angularly lifting/lowering said rigid support framework (13) with respect to said support frame, a self-centering assembly (14) overhangingly carried by said rigid support framework (13) at the foreheadof said support frame (2), whereby its axis of rotation is substantially normal to said articulation axis (12), and bead-releasing means carried by said rigid support framework. The tire assembling/disassembling machine further comprises a pair of side bead-releasing assemblies (34, 42), supported by said rigid support, framework (13) and each located on the opposite side with respect to said self-centering assembly (14), driving means (25, 26) for each bead releasing assembly (34, 42) designed to move its respective bead-releasing assembly (34 or 42) between a rest position and a working position in a substantially normal direction with respect to said articulation axis, and a fitting tool (47) overhangingly supported by one of said bead-releasing assemblies (42), thereby being angularly displaceable with respect thereto and to said self-centering assembly (14).

12 Claims, 8 Drawing Sheets

TIRE ASSEMBLING RELEASE MACHINE FOR INDUSTRIAL VEHICLE WHEELS

BACKGROUND OF THE INVENTION

The present invention relates to a tire assembling/disassembling machine for industrial vehicle wheels, e.g. truck wheels.

As known, there is a growing demand for maintenance service to be provided for industrial vehicle wheels, namely road transport trucks, along transport routes, i.e. major freight forwarding roads, or at relay or refreshment areas or elsewhere, rather than at a tire-centre. In order to make service swifter, some tire dealers use mobile servicing units, usually comprising a van equipped for this purpose, i.e. provided with a tire assembling/disassembling machine, as well as with at least one power generator, one or more vehicle lifting device/s, one compressor for compressed air supply, one workbench and minimum stock of spare wheels which are rather cumbersome.

However, since conventional tire assembling/disassembling or release machines are designed to be used at fixed stations, besides being exceedingly cumbersome to be fitted on fast vans, they require a great power to be operated, power that can hardly be available on a fast van, but at prohibitive costs.

SUMMARY OF THE INVENTION

It is a main object of the present invention to provide a new tire assembling/disassembling machine for industrial vehicle wheels which is suitable for fulfilling the needs of on-the-road mobile service by means of suitably equipped fast vans.

Another object of the present invention is to provide a new tire assembling/disassembling machine suitable for carrying out tire assembling and disassembling operations with tire wheels of trucks and industrial vehicles at high effectiveness and speed.

A further object of the present invention is to provide a tire disassembling machine at competitive manufacturing and operating costs with respect to conventional tire assembling/disassembling machines.

These and other objects, that will be better apparent below, are attained by a tire assembling/disassembling machine for industrial vehicle wheels, which has a support base frame delimiting a forehead, a back and two sides, a support rigid framework articulated, in use, at the rear of the support frame according to a horizontal articulation axis, driving means for angularly lifting/lowering said rigid support framework with respect to said support frame, a self-centring assembly overhangingly carried by said rigid support framework at the front thereof, whereby its axis of rotation is substantially normal to said articulation axis, and bead releasing means carried by said rigid support framework, characterised in that it comprises a pair of side bead-releasing assemblies supported by said rigid support framework and each located on the opposite side with respect to said self-centring assembly, driving means for each bead releasing assembly designed to move a respective bead-releasing assembly between a withdrawn rest position and an extended working position in a direction perpendicular to said articulation axis, and a fitting tool overhangingly supported by one of said bead releasing assemblies, whereby being angularly displaceable with respect thereto and to said self-centring assembly.

Advantageously, slidable guiding means is provided which is carried by said rigid support framework and delimiting at least one sliding path substantially parallel to said articulation axis for said pair of bead-releasing assemblies, and driving means designed to simultaneously displace sideways said pair of bead-releasing assemblies close to and away from said self-centring assembly.

BRIEF DESCRIPTION OF THE DRAWINGS

Further aspects and advantages of the present invention will be better apparent from the following detailed description of one currently preferred not exclusive embodiment of a tire assembling/disassembling machine for industrial vehicle wheels shown by way of illustrative not limiting example in the accompanying drawings, in which.

In the accompanying drawings, the same or similar parts or components are designated at the same reference numerals.

DETAILED DESCRIPTION OF THE PREFERRED EMBODIMENT

Figure 1:
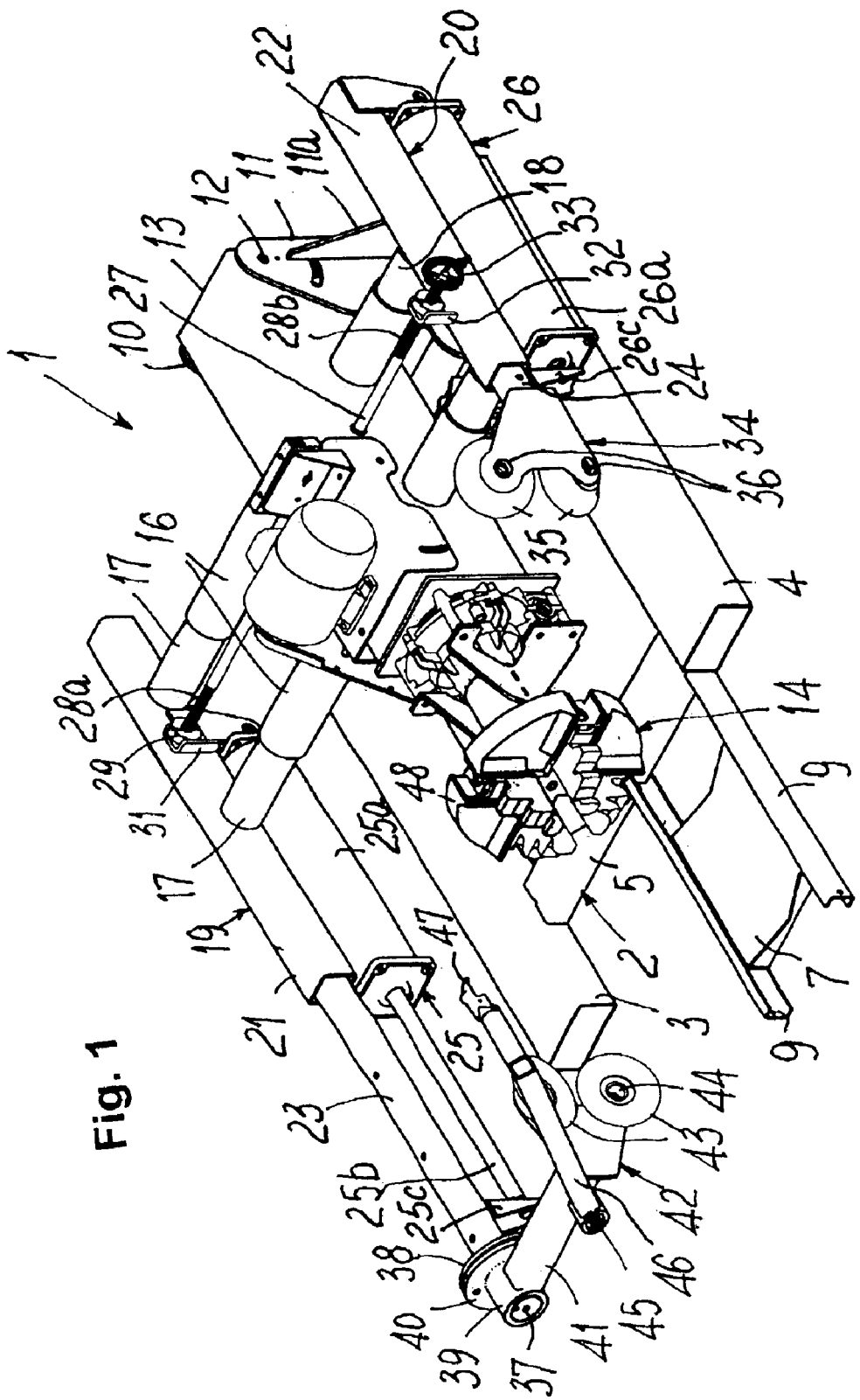
FIG. 1 shows a perspective top view, slightly from one side, of a tire assembling/disassembling machine according to the present invention.
Figure 2:
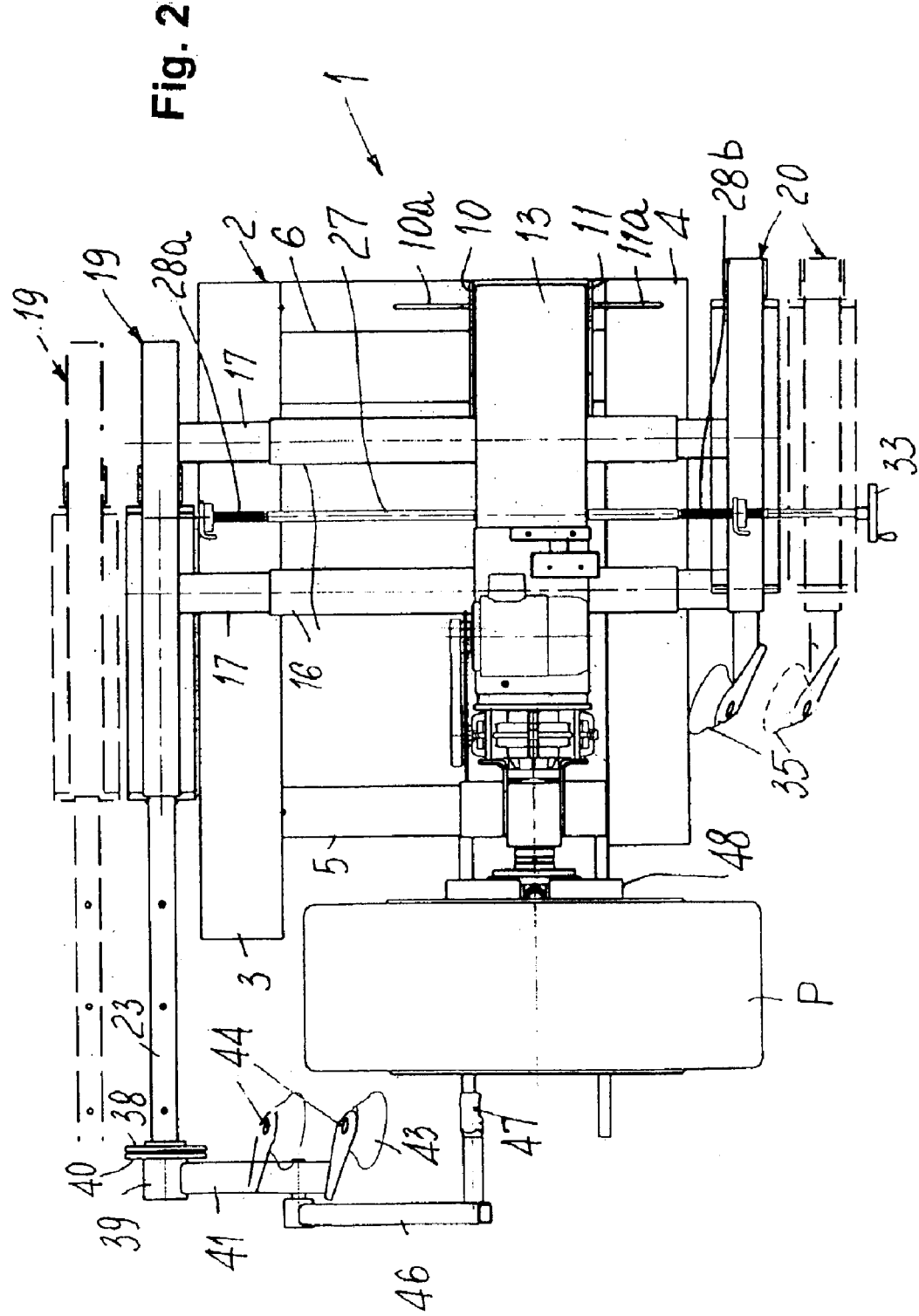
FIG. 2 is a top view of the tire assembling/disassembling machine shown in FIG. 1.
Figure 3:
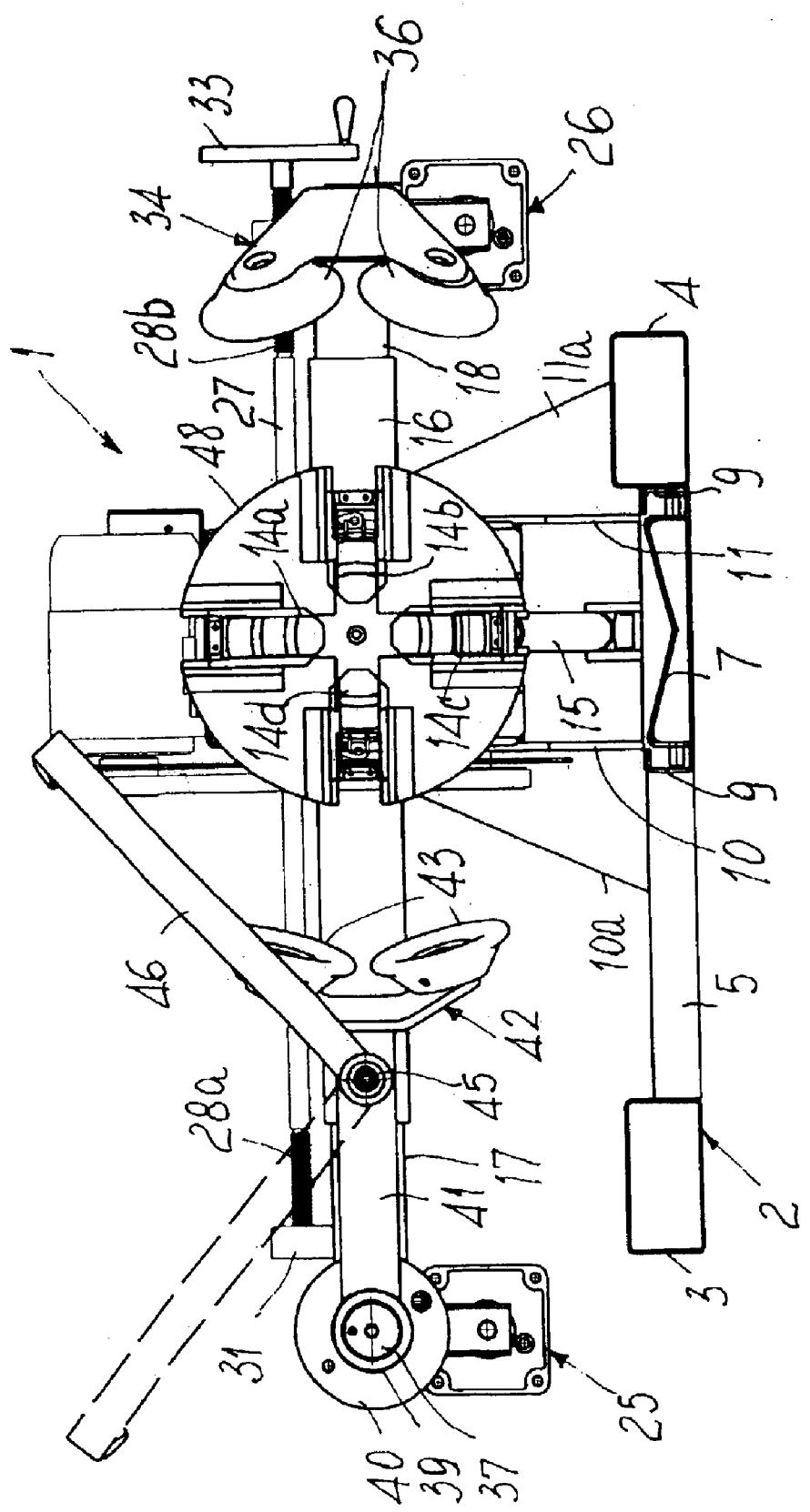
FIG. 3 shows a front view of the tire assembling/disassembling machine shown in FIG. 1.
Figure 4:
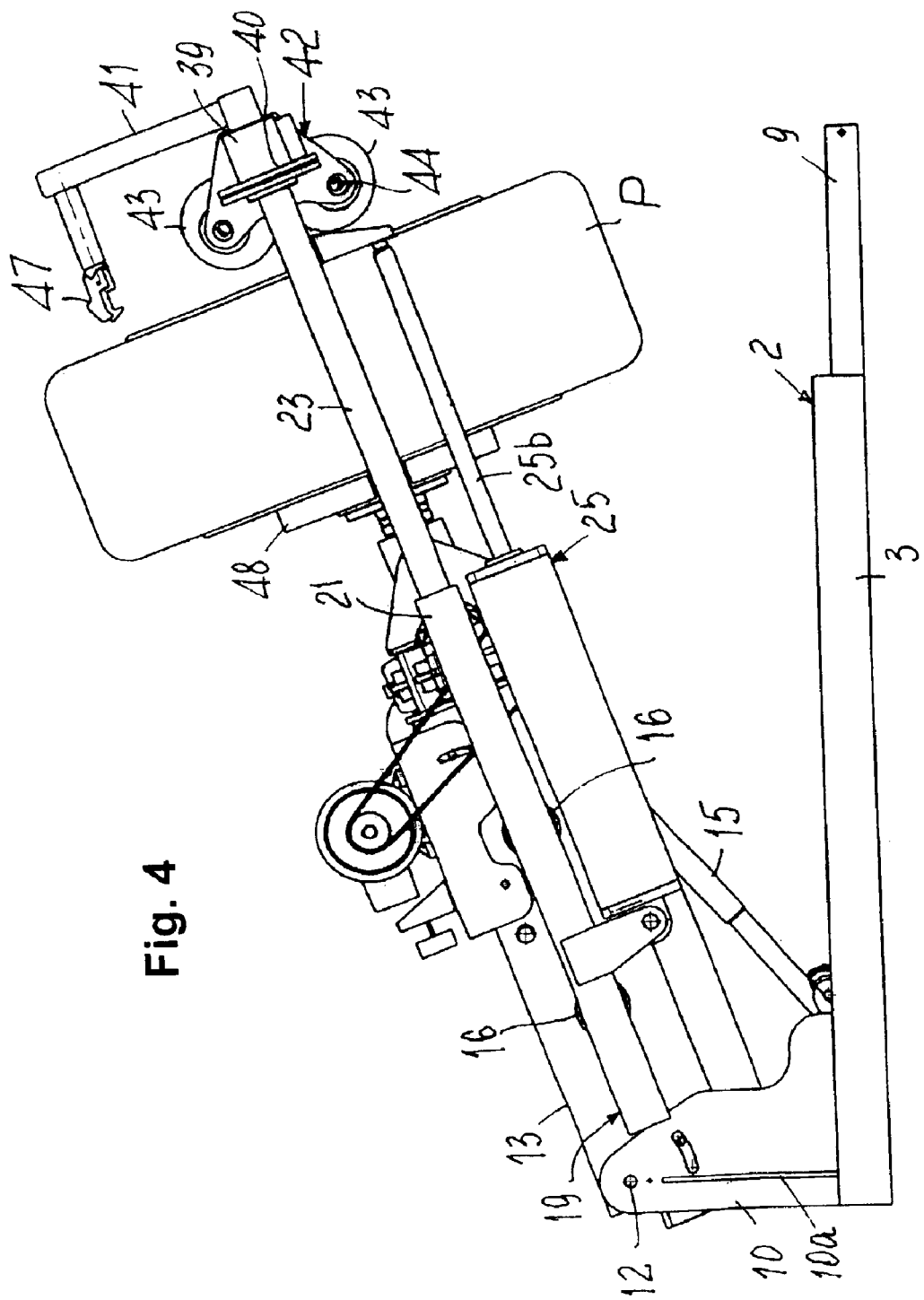
FIG. 4 is a side view of the tire assembling/disassembling machine of FIG. 1 with a truck wheel including a tire locked on the machine and slightly lifted above ground.
Figure 5:
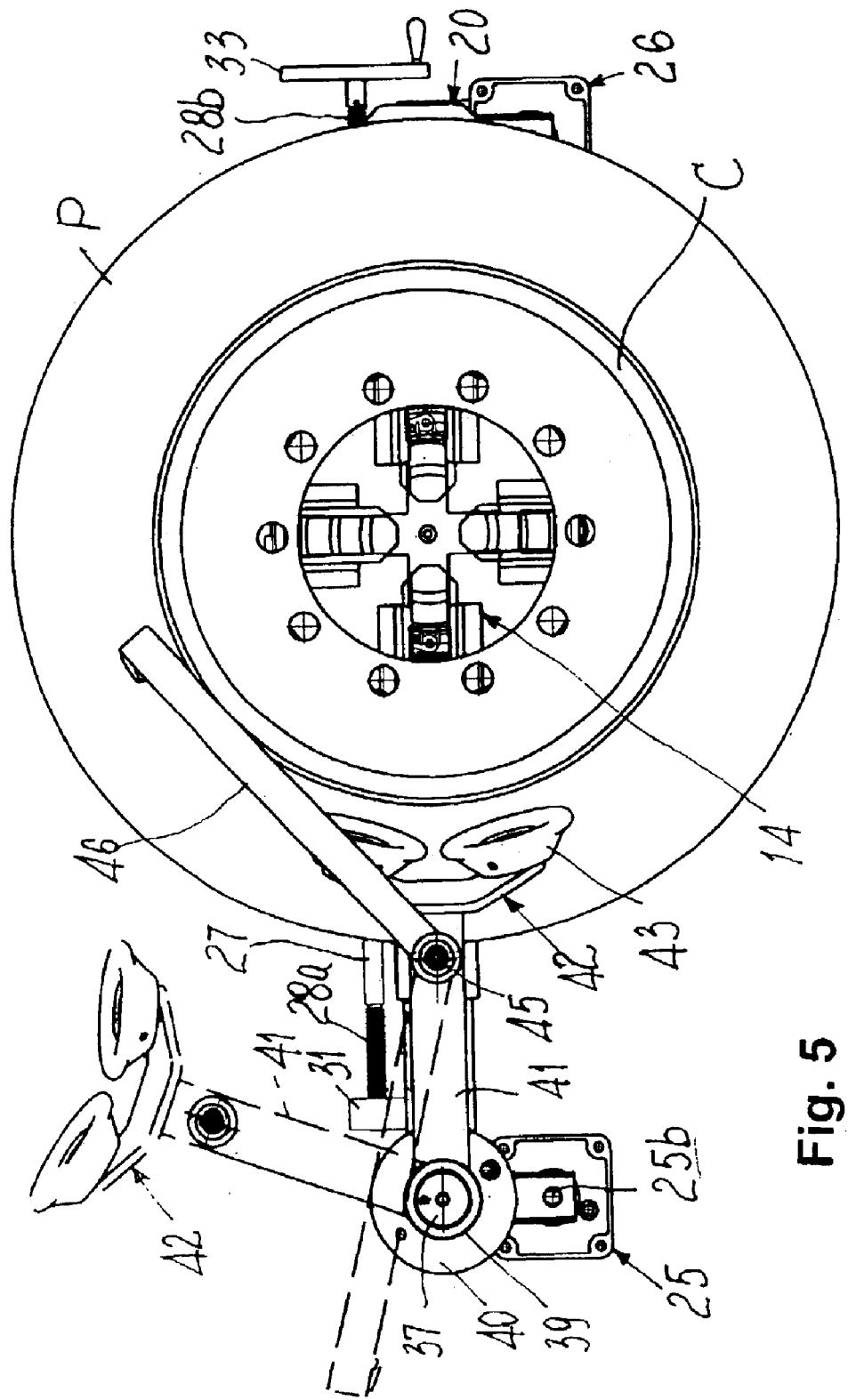
FIG. 5 shows a detail of FIG. 3 with fitting tool lowered and in a working position with respect to a wheel-rim with the tire lifted by the tire assembling/disassembling machine.
Figure 6:
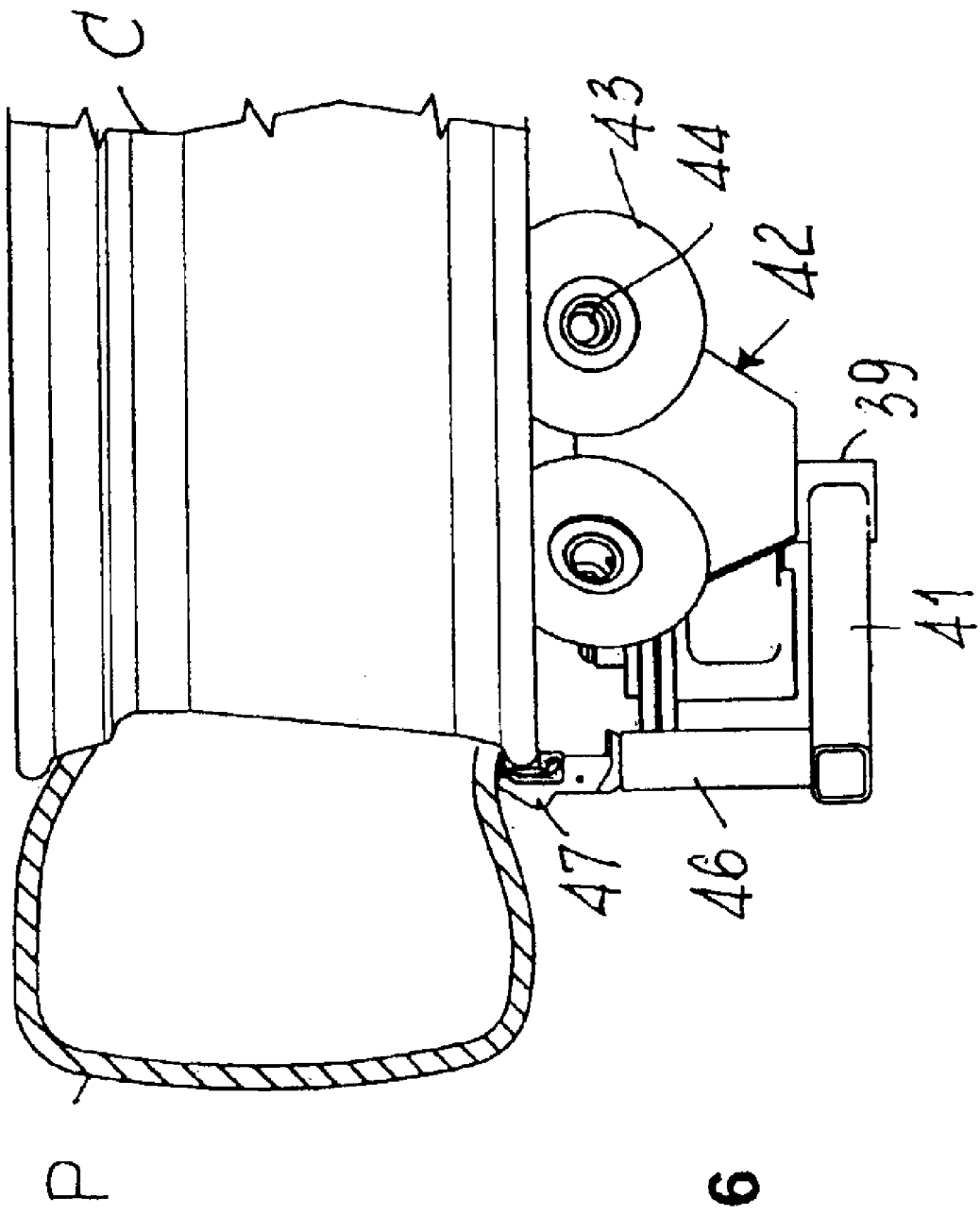
FIG. 6 is a diagrammatic view of a detail of the assembling tool in a working position thereof.

With reference to the above listed Figures, it will be noted that a tire assembling/disassembling machine, generally indicated at 1, according to the present invention, designed to assemble/disassemble tires P to and from wheel-rims R for industrial vehicle wheels, has a support frame 2 such as a loading flatbed of a fast van for road servicing. Frame 2 is preferably formed by two side longitudinal members 3 and 4 parallel with each other, e.g. tubular in shape, securely connected to each other through two or more cross-members: a front cross-member 5 and a rear cross-member 6, thereby delimiting together a forehead, a back and two sides of frame 2. At its forehead, e.g. close to the front cross-member 5, the support frame 2 is provided with a footboard 7 displaceable along a pair of side guides 9, e.g. each comprising two C bars, for reaching an adjustable working position, as it will be further explained below.

A pair of support brackets 10 and 11 rise at the rear cross member 6 at the back of support frame 2, and are each preferably reinforced by respective buttresses 10a and 11a welded thereto. One end of a sturdy tubular girder 13 is articulated to brackets 10 and 11 through an articulation pin 12 arranged horizontally, in use, and preferably being square in cross-section, that forms a rigid support frame extending towards the front of frame 2, where its other end overhangingly supports at its head a self-centring assembly 14. The self-centring assembly 14 is thus carried by girder 13 at the front of support frame 2 and its axis of rotation is substantially normal to the articulation axis of pin 12.

Girder 13, and thus self-centring assembly 14, can effect angular lifting/lowering displacements about pin 12 with respect to support frame 2, owing to driving means, preferably comprising a double acting oil operated jack, generally designated at 15, having one end thereof articulated to the rear cross-member 6, e.g. between brackets 10 and 11, and its other end articulated to a lower intermediate section of girder 13.

Girder 13 also supports a pair of straight support and guide elements, e.g. comprising two fixed tubular cross-members 16, so arranged as to have their longitudinal axes substantially parallel to articulation pin 12. Tubular cross-members 16 preferably have the same size and each of them has an end portion protruding from girder 13. Two opposite sections 17 and 18 of a bar or tube are telescopically mounted in each tubular cross-member 16 and at the end thereof outside their respective telescopic cross-member, support a respective telescopic assembly 19 and 20, the telescopic assemblies 19 and 20 thus being arranged on opposite sides with respect to girder 13, and thus to self-centring assembly 14, and extending parallel to the axis of rotation of the self-centring assembly.

Each telescopic assembly 19 and 20 preferably comprises a respective rigid support and guide element, e.g. comprising a tube 21, 22, respectively, e.g. square in cross-section, a bar 23, 24 also square in cross-section and in telescopic engagement in a respective tube 21, 22, and a respective air-operated double-acting jack 25, 26, e.g. having its cylinder 25a, 26a fixed parallel to its respective tube 21, 22, and its piston rod 25b, 25c connected to the protruding end of its respective movable bar 23, 24, e.g. by means of a gusset plate 25c, 26c welded to its respective bar 23, 24.

With such a structure, the telescopic assemblies 19 and 20 are supported so that they can be moved towards and away from one another parallel to girder 13. To this purpose, the tire assembling/disassembling machine is provided with driving and control means for simultaneously displacing the two telescopic assemblies 19 and 20. Such means can be manually operated, e.g. comprising a transverse shaft 27 mounted for rotation on girder 13 and having its two end sections 28a, 28b threaded with a reverse threading (right and left handed) and in screwing engagement with a respective nut screw 29, 30 supported by a respective bracket 31, 32 welded or otherwise fixed to its respective cylinder 21, 22.

One of the ends of shaft 27, e.g. end 28b, has a manoeuvring handwheel 33 keyed onto its head. Alternatively, shaft 27 can be driven, upon control, by a reversible electric motor.

Bar 24 of telescopic assembly 20 supports at its head a first bead releasing assembly 34, hereinafter also referred to as rear bead releasing assembly, comprising one or, preferably, two idle bead releasing roller elements 35 which are conical in shape and have their axes of rotation 36 inclined through a predetermined angle with respect to the axis of rotation of the self-centring assembly 14.

Bar 23 of telescopic assembly 19, instead, supports at its free head a pin 37, preferably provided with a flange 38. A bush 39, preferably provided with a flange 40 and designed to slidably abut against flange 38, is mounted for rotation on a pin 37. Bush 39 supports a transverse arm 41 that extends in a substantially normal direction to the axis of rotation of the self-centring assembly 14 and at its distal end from the sleeve 39 it overhangingly carries a second bead releasing assembly 42, or front bead releasing assembly having one or, preferably, two idle conical bead releasing roller elements 43, whose axes of rotation are inclined through a predetermined angle with respect to the axis of rotation of the self-centring assembly 14.

Arm 41 also has a transverse pin 45 protruding therefrom and extending towards the front of the tire assembling/disassembling machine. To pin 45 an end of a crank arm 46 is articulated, comprising a first section lying in a plane parallel to arm 41 and a second section extending substantially parallel to the axis of rotation of the self-centring assembly 14. Preferably, arm 41 is snugly or slightly yieldingly articulated to pin 45, thereby allowing small wavings of arm 46. At its free end, arm 46 carries a fitting tool 47.

Figure 7:
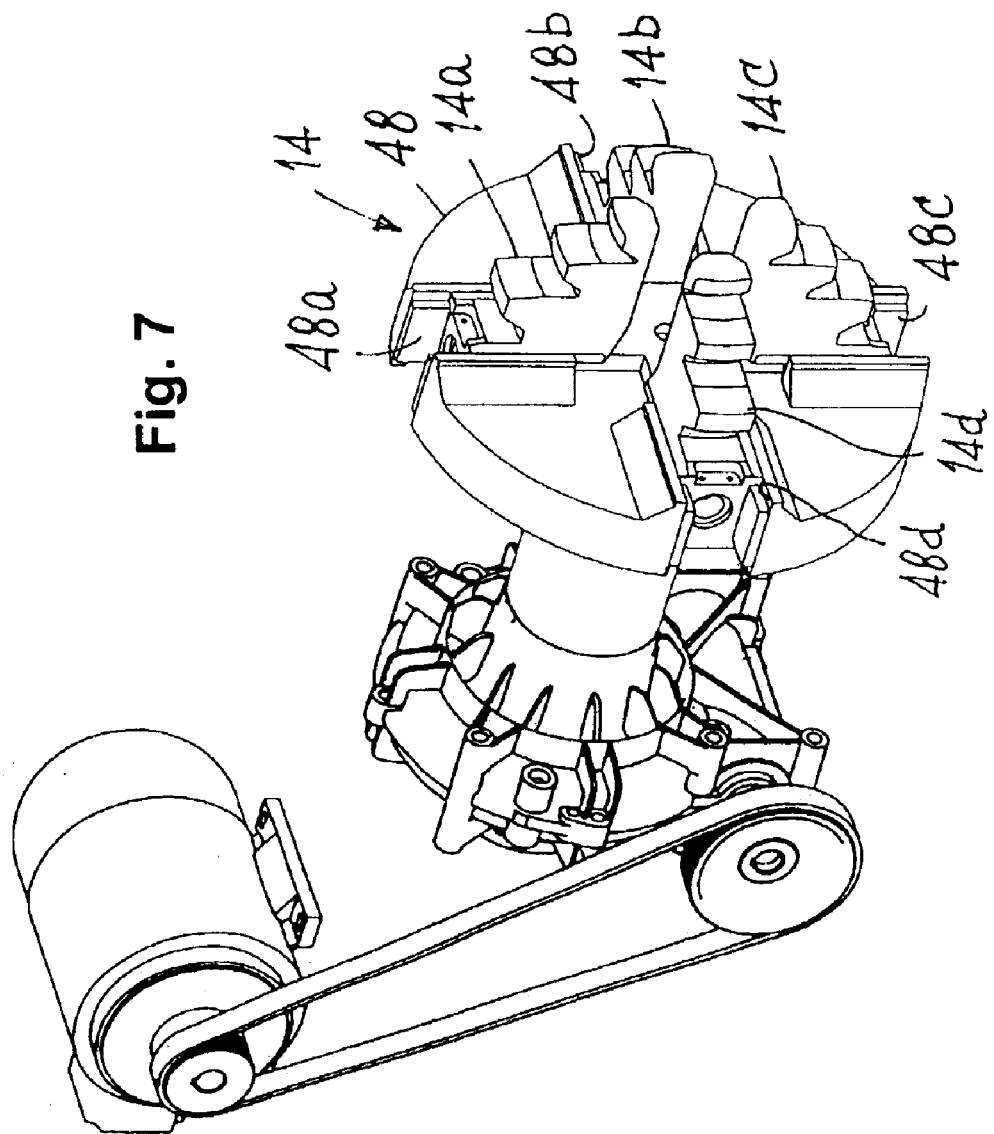
FIG. 7 shows a perspective view of a self-centring assembly driven by an electric motor and provided with a respective motion transmission.
Figure 8:
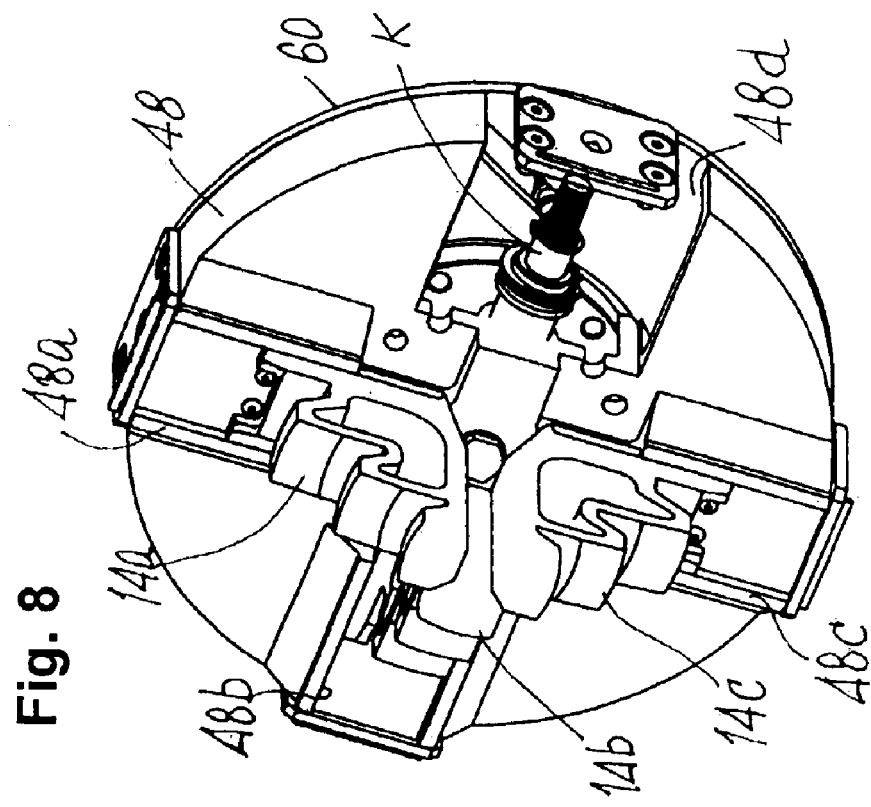
FIGS. 8 and 9 illustrate a perspective view of the front and rear, of the self-centring assembly, respectively.
Figure 9:
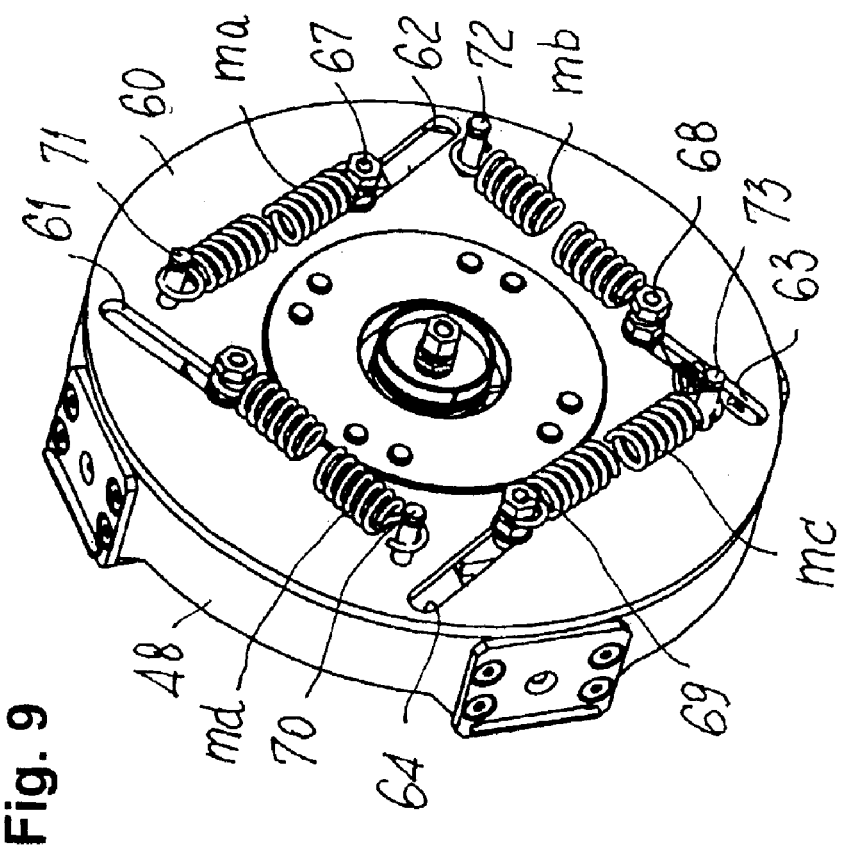

The self-centring assembly 14 has preferably a support flange 48, onto which four step jaws 14a, 14b, 14c and 14d are slidingly mounted in a respective guiding groove 48a, 48b, 48c and 48d (FIG. 7). Each step jaw is biased by a respective return spring ma, mb, mc and md, preferably located on the opposite side of flange 48 and provided with a fluid-operated driving jack—only one of which designated at k is visible in FIG. 8—to provide a strong clamping action. Preferably, jacks k are each inserted in the guiding groove of its respective jaw and are fed with pressurised oil by an air and oil operated pump (not shown).

In order to ensure that the four jaws 14a, 14b, 14c and 14d are moved synchronously, they are connected at their back to flange 48 by means of a disk 60, in which slots 61, 62, 63 and 64 are formed which extend diagonally inclined parallel to a respective recess 48a–48d and in which a respective pin 66, 67, 68 and 69 is slidably mounted on a suitable roller 65 for being engaged by one end of a respective spring ma-md whose other end is anchored to a respective fixed pin 70, 71, 72 and 73. Thus, disk 60 is biased to rotate concentrically with flange 48 by the inclination of slots 61–64, thereby keeping the jaws equidistant, i.e. in synchronous relationship with respect to each other.

Advantageously, controls are located on a movable control panel (not shown in the drawings) and, are operated by compressed air for greater safety of use.

The tire assembling/disassembling machine 1 described above is very easy to use. In its normal rest or inoperative position, it becomes compact owing to the fact that both the telescopic assemblies 19 and 29 can be moved close to the girder 13 to a maximum extent, and the girder 13 together with self-centring assembly 14, telescopic assemblies 19 and 20, bead releasing assemblies 34 and 42 and tire assembling/disassembling tool 47 are lowered close to the support frame 2.

By way of example, in order to disassemble a truck tire P from a wheel-rim C starting from the condition of the tire assembling/disassembling machine shown in FIG. 1, an operator first moves telescopic assemblies 19 and 20 away from girder 13 acting on handwheel 33, and then, manually upturns arm 46 to to extend it outside of the machine 1, and thus the (rear) bead releasing group 34 and the (front) bead releasing group 42 are synchronously moved away from one another by a distance related to the diameter of wheel-rim C, and the area in front of the machine is cleared. The operator then rolls a wheel onto the footboard 7 located at the self-centring assembly 14, and then, by acting on a suitable push-button control on the mobile panel, causes the girder 13, and thus self-centring assembly 14, to be lifted until its axis it brought to a substantially centered position on wheel-rim C by energizing the air and oil operated pump for driving the self-centring assembly 14. After that, if necessary, the operator causes the movable footboard 7 to advance towards the self-centring assembly 14 and the clamps 48 to be tightened, whereby the edge of wheel-rim C is safely engaged among the clamps, and the wheel is blocked in the self-centring assembly 14.

The operator then causes girder 13, and thus the wheel blocked in the self-centring assembly 14, to be angularly lifted, along a curved path about the articulation pin 12, until it reaches a fully safelifting height above the footboard 7 in order to be able to rotate about the axis of rotation of the self-centering assembly 14.

At this stage, the operator causes the front bead-releasing unit 42 to advance towards the wheel by causing the jack to shorten, whereby the bead releasing rollers 43 are brought with a predetermined preload or thrust against the bead on the outer side of tire C. He causes then the self centering assembly to rotate so that the bead is released from the outer side of tire P.

The operator then controls jack 20 by causing it to shorten until e bead releasing rollers 35 abut with a predetermined effort or stress against the bead of the inner side of tire C. Once the positioning operation of bead releasing roller 35 has been completed, bead releasing rollers 35 are located in a diametrically opposite position with respect to the wheel, though acting onto a different front of the wheel with respect to the position previously taken by the bead releasing rollers 43. The operator causes then self-centring unit 14 to rotate, thereby obtaining the bead release also at the rear side of tire C.

Once bead release has been completed, the operator stops rotation of the self-centring assembly 14 and, by acting manually on arm 46, displaces the tire assembling/disassembling tool to a position between the front bead and the edge of the wheel-rim and removes and disassembles tire P from the wheel-rim in a conventional way.

For assembling a tire P onto wheel-rim C one proceeds first with inserting the inner bead while the outer rollers 43 push onto it, then bead releasing tool 47 is positioned on the edge of the wheel-rim C and the tire-fitting is completed by the action of the rollers 42 and rotation (usually in an anticlockwise direction) of the self-centring unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire assembling/disassembling machine comprising
   a support base frame delimiting a forehead, a back and two sides,
   a rigid support framework articulated at the back of said support frame according to an articulation axis,
   driving means for angularly lifting/lowering said rigid support framework with respect to said support frame,
   a self-centring assembly overhangingly carried by said rigid support framework at the forehead of said support frame, whereby its axis of rotation is substantially normal to said articulation axis,
   bead-releasing means carried by said rigid support framework,
   a pair of side bead-releasing assemblies supported by said rigid support framework and each located on the opposite side with respect to said self-centring assembly,
   driving means for each bead releasing assembly designed to move its respective bead-releasing assembly between a rest position and a working position in a substantially normal direction with respect to said articulation axis, and
   a fitting tool means overhangingly supported by one of said bead-releasing assemblies, thereby being angularly displaceable with respect thereto and to said self-centring assembly.

2. A machine as claimed in claim 1, comprising
   slidable guiding means carried by said rigid support framework and delimiting the same number of sliding paths substantially parallel to said articulation axis for said pair of bead-releasing assemblies, and
   driving means designed to synchronously move laterally together and away from one another, upon control, said pair of bead releasing assemblies with respect to said self-centring assembly.

3. A machine as claimed in claim 2, wherein said slidable guiding means comprises
   a pair of telescopic cross-members fixed to said rigid support framework, and
   a pair of bars or tubes telescopically mounted in a respective telescopic cross-member.

4. A machine as claimed in claim 3, comprising two telescopic assemblies laterally located on opposite sides with respect to said rigid support framework, supported by one respective pair of bars or tubes, and extending parallel to the axis of rotation of said self-centring assembly.

5. A machine as claimed in claim 4, wherein each telescopic assembly comprises
   a support and guide element,
   a movable bar telescopically engaging with its respective support and guide element, and
   a respective double-acting linear actuator means having one end thereof fixed to its respective support and guide element and its other end anchored to a respective movable bar.

6. A machine as claimed in claim 2, wherein said driving means comprises
   a transverse shaft mounted for rotation in said rigid support framework and having its end sections provided with a reverse threading,
   a pair of threaded connectors designed to threadably engage a respective end section of said shaft and carried by a respective telescopic assembly, and
   a control wheel keyed onto one end of said shaft.

7. A machine as claimed in claim 6, comprising a first bead-releasing assembly carried by said movable bar of said telescopic assembly and having at least one idle roller element, the axis of rotation of which is inclined through a predetermined angle with respect to the axis or rotation of said self-centring assembly.

8. A machine as claimed in claim 6, comprising
   a first bead-releasing assembly carried by said movable bar of said telescopic assembly and having at least one idle roller element, the axis of rotation of which is inclined through a predetermined angle with respect to the axis or rotation of said self-centring assembly, and
   a transverse arm extending in a substantially normal direction with respect to the axis of rotation of said self-centring assembly and having one end articulated to said movable bar of said telescopic assembly, whereas its other end supports a second bead-releasing assembly having at least one idle roller element, the axis of rotation of which is inclined through a predetermined angle with respect to the axis of rotation of said self-centring assembly.

9. A machine as claimed in claim 8, further comprising a pin supported at its free-end by said movable bar, and a bush mounted for rotation on said pin and arranged to rotate together with said transverse arm.

10. A machine as claimed in claim 9, further comprising a first flange fixed to said movable bar or to said pin, and a second flange rotating together with said bush and designed to slidingly engage said first flange.

11. A machine as claimed in claim 8, comprising a crank arm having a first section articulated to a pin parallel to said movable bar, fixed to said arm and extending in a plane parallel thereto, and a second section extending substantially parallel to the axis of rotation of said self-centring assembly and supporting said fitting tool.

12. A machine as claimed in claim 6, wherein said self-centring assembly comprises a rotatable supporting flange, four stepped jaws slidably mounted in a respective guide groove and protruding from one face of said flange, an air-operated actuating jack for each jaw arranged in a respective guide groove, a disk resting against the opposite face of said flange and provided with a number of through holes each extending parallel to a respective groove, a return spring arranged at said disk for each jaw, each return spring having one end thereof anchored to a respective jaw, and its other end anchored to a respective pin fixed to its respective jaw.

* * * * *